May 3, 1932.     G. P. DESPRET     1,856,278
PROCESS AND PLANT FOR THE CASTING OF ROUGH PLATE GLASS
Filed July 13, 1929
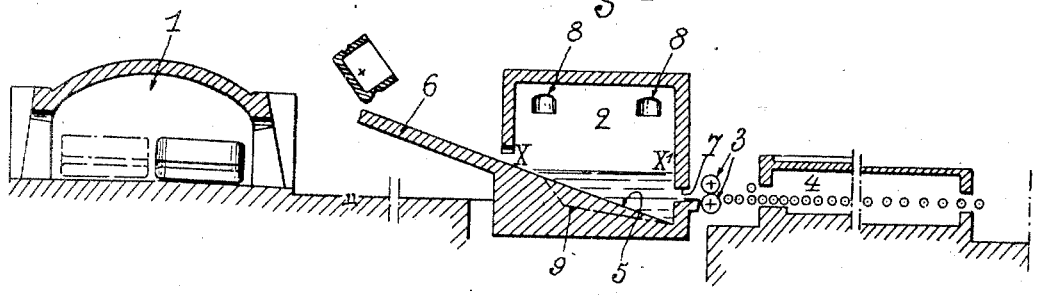
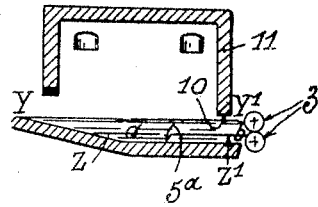
INVENTOR
Georges Paul Despret
by
Attorney Patented May 3, 1932

1,856,278

UNITED STATES PATENT OFFICE

GEORGES PAUL DESPRET, OF PARIS, FRANCE, ASSIGNOR TO COMPAGNIES REUNIES DES GLACES & VERRES SPECIAUX DU NORD DE LA FRANCE, OF BOUSSOIS-SUR-SAMBRE, FRANCE

PROCESS AND PLANT FOR THE CASTING OF ROUGH PLATE GLASS

Application filed July 13, 1929, Serial No. 377,955, and in France August 23, 1928.

The present invention relates to a process and plant for the casting of rough plate glass, the glass being melted and refined in a crucible furnace.

The process according to the invention, which provides for the continuous casting of rough glass, is chiefly characterized by the fact that the contents of each crucible is poured separately and in succession into a heated recipient, so that the melted and refined glass will be maintained at the casting temperature, each crucible being poured in before the whole contents of the crucible previously poured has proceeded into the mechanical apparatus for rolling out the glass, which is continuously supplied by the said recipient.

The plant for the operation of the said process is chiefly characterized by the fact that it comprises, in combination, a crucible furnace, a recipient whose capacity is somewhat greater than that of a crucible, means for heating said recipient, and a rolling mill followed by an annealing furnace of the roller type which is continuously supplied by the said recipient.

In the said process according to the invention, the glass is melted and refined in a crucible furnace, the crucibles being poured separately and in turn into a recipient which is heated in such manner as to maintain the melted and refined glass at the casting temperature, which is 200°–300° C. below the melting point of the glass. The contents of each crucible is poured into the recipient before the whole contents of the crucible previously poured has passed through the apparatus adapted for the treatment of the crude glass, which preferably consist of a rolling mill followed by an annealing furnace of the roller type. This will provide in the said recipient a fused connection between the residual contents of a given crucible and the contents of the crucible poured in immediately afterwards, which connection is obtained due to the fact that the recipient is heated to the casting temperature, as above stated. This will afford the continuous casting of rough plate glass, while at the same time employing a crucible furnace for the melting and refining of the glass, as well as a rolling mill for rolling out the said melted and refined glass.

In the accompanying drawings, which are given by way of example:

Fig. 1 is a general view of an installation for the said process according to the invention.

Fig. 2 is a partial section of a modified form of construction of the furnace shown in Fig. 1.

In the example shown in Fig. 1, the plant comprises a crucible furnace 1, known per se, as well as a heated chamber 2, a rolling mill 3 and an annealing furnace of the roller type.

The said chamber 2 herein consists of a furnace whose sole 5 is inclined and is extended outside the furnace by a pouring table 6. The furnace 2 has on its face situated next the rolling mill an aperture 7 for the discharge of the melted and refined glass contained in the said furnace. The dimensions of the said furnace 2 are determined in such manner that it may receive more than the contents of one crucible and less than the contents of two crucibles. The level of the melted and refined glass in said furnace, when the said crucible has been emptied into the said furnace, is approximately the level shown by the dotted line X—X¹ of the drawings. The height at which the aperture 7 is situated is such that there will always remain in the furnace a sufficient quantity of glass to effect a fused connection between this quantity of glass and the contents of a crucible which is subsequently poured in. Obviously, for the continuous casting of glass plates, each crucible is emptied into the furnace 2 before the level of the glass which is melted and refined in the said furnace descends below the aperture 7. The furnace is heated to the casting temperature by two burners 8, the heating temperature being below the temperature of fusion of the glass, as already stated.

In a modification, the hearth 5 of the furnace is no longer straight, but it may comprise, throughout its whole width, a recess whose outline is shown in dot-and-dash lines at 9, thus forming so to speak a casting ladle within the furnace itself.

Fig. 2 shows a modification of the furnace 2, and herein the hearth 5ª comprises a part a—b which is practically horizontal, at whose level is formed an aperture 10 in the front wall 11 of the furnace, adjacent the rolling mill. With this furnace, the level of the glass is variable between the limits indicated by the lines $Y—Y^1$ and $Z—Z^1$, and the upper roller of the said mill forms in fact a sort of dam against the excessive flow of the melted and refined glass. As in the preceding device for the continuous casting of the glass, each crucible is poured into the furnace before the contents of the preceding crucible has been entirely treated in the rolling mill.

The rolling mill 3 and the annealing furnace 4 provided with rollers are operated at the same speed, which is equal to the rate of travel of the glass in the said annealing furnace, in order that the annealing may be effected in the proper conditions.

Having now described my invention what I claim as new and desire to secure by Letters Patent is:—

In a process for the continuous casting of relatively thin rough plate glass by starting from glass melted and fully refined in crucibles, the steps consisting in pouring separately and successively the contents of crucibles into a small container, the capacity of which somewhat exceeds the capacity of one crucible but is less than its double, each crucible being poured before the whole contents of the crucible previously poured into said container has been rolled in heating said container for maintaining the glass contained therein at the casting temperature, and in directly rolling said glass into a plate as it is flowing out of said container so as to form an uninterrupted thin ribbon of rolled glass with the contents of said crucibles.

In testimony whereof I have signed my name to this specification.

GEORGES PAUL DESPRET.